(12) United States Patent
Maligie

(10) Patent No.: US 10,857,760 B2
(45) Date of Patent: Dec. 8, 2020

(54) RELEASE FILMS

(71) Applicant: Airtech International, Inc., Huntington Beach, CA (US)

(72) Inventor: John David Maligie, Huntington Beach, CA (US)

(73) Assignee: AIRTECH INTERNATIONAL, INC., Huntington Beach, CA (US)

( * ) Notice: Subject to any disclaimer, the term of this patent is extended or adjusted under 35 U.S.C. 154(b) by 0 days.

(21) Appl. No.: 16/458,610

(22) Filed: Jul. 1, 2019

(65) Prior Publication Data

US 2019/0322075 A1   Oct. 24, 2019

Related U.S. Application Data

(63) Continuation of application No. 15/213,108, filed on Jul. 18, 2016, now Pat. No. 10,336,033.

(60) Provisional application No. 62/215,486, filed on Sep. 8, 2015.

(51) Int. Cl.
| | |
|---|---|
| *B32B 7/02* | (2019.01) |
| *B32B 27/08* | (2006.01) |
| *B32B 27/32* | (2006.01) |
| *B32B 27/18* | (2006.01) |
| *B32B 27/34* | (2006.01) |
| *B32B 7/12* | (2006.01) |
| *B32B 27/30* | (2006.01) |
| *B32B 7/04* | (2019.01) |
| *B32B 7/06* | (2019.01) |
| *B32B 25/08* | (2006.01) |
| *B32B 25/14* | (2006.01) |
| *B29C 48/08* | (2019.01) |
| *B29C 48/21* | (2019.01) |
| *B32B 37/12* | (2006.01) |

(52) U.S. Cl.
CPC ............... *B32B 7/02* (2013.01); *B29C 48/08* (2019.02); *B29C 48/21* (2019.02); *B32B 7/04* (2013.01); *B32B 7/06* (2013.01); *B32B 7/12* (2013.01); *B32B 25/08* (2013.01); *B32B 25/14* (2013.01); *B32B 27/08* (2013.01); *B32B 27/18* (2013.01); *B32B 27/304* (2013.01); *B32B 27/32* (2013.01); *B32B 27/322* (2013.01); *B32B 27/34* (2013.01); *B32B 37/12* (2013.01); *B32B 2250/24* (2013.01); *B32B 2270/00* (2013.01); *B32B 2274/00* (2013.01); *B32B 2307/4026* (2013.01); *B32B 2307/51* (2013.01); *B32B 2307/748* (2013.01); *B32B 2309/105* (2013.01); *B32B 2605/08* (2013.01); *B32B 2605/18* (2013.01)

(58) Field of Classification Search
CPC ..... B29C 48/08; B29C 48/21; B32B 2250/24; B32B 2270/00; B32B 2274/00; B32B 2307/4026; B32B 2307/51; B32B 2307/748; B32B 2309/105; B32B 25/08; B32B 25/14; B32B 2605/08; B32B 2605/18; B32B 27/08; B32B 27/18; B32B 27/304; B32B 27/32; B32B 27/322; B32B 27/34; B32B 37/12; B32B 7/02; B32B 7/04; B32B 7/06; B32B 7/12
See application file for complete search history.

(56) References Cited

U.S. PATENT DOCUMENTS

| | | |
|---|---|---|
| 5,817,386 A | 10/1998 | Adamko et al. |
| 6,440,566 B1 | 8/2002 | Maligie et al. |
| 2015/0368418 A1 | 12/2015 | Wilken et al. |

OTHER PUBLICATIONS

"Release Agent Free FRP Component Manufacture Using FLEX PLAS Release Film." *Fraunhofer IFAM* n. p., (undated). Web: http://www.ifam.fraunhofer.de/content/dam/ifam/en/documents/Adhesive_Bonding_Surfaces/plato/ffm_plato_flexplas_en_fraunhofer_ifam.pdf.

"Faster, Lower Costs, and Improved Quality: Fraunhofer IFAM Accelerates Industrial Processes." *Fraunhofer IFAM*, Annual Report 2011/2012, pp. 67-76.

"Pioneering Development: FLEX PLAS Allows Large FRP Components to be Manufactured Without the Use of Release Agents." *Fraunhofer IFAM*, Annual Report 2012/2013, pp. 107-109.

*Primary Examiner* — Lawrence D Ferguson
(74) *Attorney, Agent, or Firm* — Lewis Roca Rothgerber Christie LLP

(57) ABSTRACT

A multilayer release film has a first outer layer comprising a first base polymer and having a first adhesion affinity, and a second outer layer comprising a second base polymer and an adhesion adjusting additive. The second outer layer has a second adhesion affinity that is different from the first adhesion affinity of the first outer layer. The difference in adhesion affinity between the first and second outer layers of the release film enable the film to exhibit full release characteristics from a molding tool (e.g., a metallic or composite surface material), but tight or controlled release from the surface of the part being cured or molded.

20 Claims, No Drawings

RELEASE FILMS

CROSS-REFERENCE TO RELATED APPLICATION(S)

This application claims priority to and the benefit of U.S. patent application Ser. No. 15/213,108 filed Jul. 18, 2016, now U.S. Pat. No. 10,336,033, which claims priority to and the benefit of U.S. Provisional Application Ser. No. 62/215,486 filed on Sep. 8, 2015 and titled MULTI-PURPOSE RELEASE FILMS, the entire contents of both of which are incorporated herein by reference.

BACKGROUND

Composites, such as reinforced resins and plastics, are widely used in various industries. Advanced composites, including high-performance reinforced resin and plastic systems, are used extensively in the automotive and aerospace industries to create composite parts capable of meeting the more demanding requirements of these applications.

Many manufacturing methods exist for the production of composite parts. However, one of the more common methods used in the automotive and aerospace industries is the pre-preg lay-up method. According to this method, a pre-preg (i.e., a fiber cloth or network pre-impregnated with a resin) is laid-up on a molding tool, and then cured to take on the shape of the molding tool, thereby forming the shape of the desired composite part. After the curing process is complete and the pre-preg is cured to form the desired part shape, the finished part must be released from the mold. However, the curing process can cause the pre-preg to stick to the molding tool, making it difficult to subsequently release the finished part from the tool.

To address this post-cure release issue, liquid release agents are sometimes coated or sprayed on the tool prior to laying-up the pre-preg for curing. However, these liquid release agents have a number of problems. For example, the liquid release agent may solidify and the solidified release material may remain on the molding tool after part manufacture and release. This residual release agent must be cleaned off the molding tool before the tool can be used to make another composite part, thus increasing the time and labor required to repeat the manufacturing process. Additionally, the solidified release agent may remain on the composite part after removal from the mold. This residual release agent must be removed from the part before the part can be painted or bonded to another material/component. Typically, the residual release agent is removed from the part surface by abrasion, shot blasting, etc., which can cause surface defects or imperfections which, in turn, cause defects or imperfections in the paint finish making the part unusable and necessitating part reworking. Further, some liquid release agents include volatile compounds (e.g., solvent-based liquid release agents), and therefore must be stored and applied very carefully in order to alleviate health risks. For example, solvent-based liquid release agents typically require special workstation ventilation equipment and personal protective equipment, which further increases cost.

SUMMARY

According to embodiments of the present invention, a release film comprises first and second outer layers. The first outer layer comprises a first base polymer and has a first adhesion affinity. The second outer layer comprises a second base polymer and an adhesion adjusting additive, and has a second adhesion affinity that is different from the first adhesion affinity of the first outer layer.

DETAILED DESCRIPTION

According to embodiments of the present invention, a release film has at least first and second outer layers with different adhesion characteristics (e.g., different adhesion affinities). In particular, in some embodiments, the first outer layer of the release film has a first adhesion affinity that is different than a second adhesion affinity of the second outer layer. As would be understood by those of ordinary skill in the art, the adhesion (or adhesion affinity) of one material to another material is heavily dependent on the chemical compositions of both materials. For example, while one material may exhibit strong adhesion to a particular chemical composition, the same material may exhibit weak adhesion to a different chemical composition. As such, as used herein, the "adhesion" or "adhesion affinity" of the first and second outer layers is described with reference to the surface to which they are configured to be applied as well as the adhesiveness of the first or second outer layer to its respective contact surface after curing (e.g., after the application of pressure and/or heat).

In some embodiments, for example, the first outer layer of the release film is configured to be applied to the surface of a molding tool used to prepare a cured composite part (for example, for use in aerospace or automotive applications), and the second outer layer of the release film is configured to be in contact with the part. Accordingly, the terms "first outer layer" and "tool-side outer layer" are used interchangeably herein to refer to the outer layer of the release film that is in contact with the molding tool during the molding or curing process. Similarly, the terms "second outer layer" and "part-side outer layer" are used interchangeably herein to refer to the outer layer of the release film that is in contact with the part being molded or cured. With this configuration, the release film provides a mechanism for cleanly releasing the molded part (after cure) from the molding tool without leaving a release agent residue on the surface of the molding tool. In particular, with the difference in adhesion characteristics between the first and second outer layers of the release film, the first outer layer (or tool-side outer layer) is configured to exhibit weaker adhesion (e.g., "easy" or "full" release, as those terms are understood by those of ordinary skill in the art) with respect to the tool surface so that after the curing process, the release film will release from the tool surface. Additionally, the second outer layer (or part-side outer layer) is configured to exhibit stronger adhesion (e.g., "controlled" or "tight" release, as those terms are understood by those of ordinary skill in the art) with respect to the part being cured.

As used herein, the terms "weaker adhesion" and "stronger adhesion" are not used as terms of degree, but rather are used to establish a relationship between the adhesion characteristics of the first and second outer layers. In particular, the term "weaker adhesion" denotes that the adhesion force (or characteristic) of the first outer layer to the tool surface is weaker than the adhesion force (or characteristic) of the second outer layer to the part surface after cure. Conversely, the term "stronger adhesion" denotes that the adhesion force (or characteristic) of the second outer layer to the part surface after cure is stronger than the adhesion force (or characteristic) of the first outer layer to the tool surface. As such, the terms "weaker adhesion" and "stronger adhesion" are not attributable to any numerical value for the adhesion forces, and instead refer to the relative strength of adhesion of the first and second outer layers to their respective contact surfaces, i.e., the first outer layer has weaker adhesion to the tool surface than the second outer layer has to the part surface (after cure). This differential in relative adhesion force between the first and second outer layers allows the release film to cleanly release from the molding tool while remaining adhered to the cured part. This enables easy "peeling" of the molded (or cured) part off the molding tool, and the release film (adhered to the part surface) acts as a protective film on the part surface, preventing (or reducing) surface contamination and the potential for physical damage.

In some embodiments, the second outer layer (or part-side outer layer) of the release film has adhesion that is sufficient to adhere to the part surface after cure, but that is also sufficient to enable relatively easy removal of the release film from the part surface. In particular, the second outer layer may have an adhesion sufficient to remain adhered to the part surface until the release film is peeled from the surface of the part using an appropriate amount of pressure. When the second outer layer (or part-side outer layer) is configured in this manner, the release film remains adhered to the part surface when the molded part is removed from the molding tool, and is only separable from the part surface on the application of sufficient peeling pressure. As would be understood by those of ordinary skill in the art, the adhesion force needed to accomplish these dual goals will vary depending on the material of the part and the material used to make the second outer layer. As such, the chemical composition of the second outer layer may be adjusted or "tailored" to provide the desired or required adhesion force. This adjustment or "tailoring" can be accomplished by varying the chemical components of the composition used to make the second outer layer, or by varying the relative amounts of the components of the composition. As the tendency of certain known materials to adhere to certain other known materials is known, those of ordinary skill in the art would be capable of tailoring the compositions described herein to achieve the adhesion required to accomplish the dual goals of the second outer layer.

Additionally, the first outer layer (or tool-side outer layer) of the release film has adhesion that is sufficient to release from the tool surface after curing the part. In particular, the first outer layer may have an adhesion sufficient to release from the tool surface when the molded part is peeled from the surface of the molding tool after cure. When the first outer layer (or tool-side outer layer) is configured in this manner, the release film easily releases from the tool surface when the molded part is removed from the molding tool. As would be understood by those of ordinary skill in the art, the adhesion force needed to accomplish this goal will vary depending on the material of the molding tool and the material used to make the first outer layer. As such, the chemical composition of the first outer layer may be adjusted or "tailored" to provide the desired or required adhesion force. This adjustment or "tailoring" can be accomplished by varying the chemical components of the composition used to make the first outer layer, or by varying the relative amounts of the components of the composition. As the tendency of certain known materials to adhere to certain other known materials is known, those of ordinary skill in the art would be capable of tailoring the compositions described herein to achieve the adhesion required to accomplish the goal of the first outer layer.

As discussed above, the release film according to embodiments of the present invention includes first and second outer layers having different adhesion properties. As also discussed, the numerical values of the adhesion of each of the layers is not particularly limited, and in fact, may be tailored based on the material of the molding tool and the material used to make the composite part. Accordingly, while the first outer layer has an adhesion value that is sufficient to allow the release film to release from the molding tool after the curing process, the numerical value of the adhesion of the first outer layer is not limited. Additionally, while the second outer layer has an adhesion value that is sufficient to allow the release film to remain adhered to the cured part, the numerical value of the adhesion of the second outer layer is also not limited. Instead, as would be understood by those of ordinary skill in the art, the numerical value of the adhesion required for each of the first and second outer layers to enable release from the molding tool and maintain adhesion to the cured part will vary depending on the material of the surface of the molding tool as well as the material used to make the cured part.

As discussed above, the material of the first outer layer is selected such that the first outer layer exhibits "easy" or "full" release (e.g., a weaker adhesion, as that term is defined above) from the surface of the molding tool after curing of a molded part. For example, in some embodiments, the material of the first outer layer may be selected such that it will "easily" or "fully" release from surfaces such as metallic surfaces, wooden surfaces, ceramic surfaces, plaster surfaces, monolithic graphite surfaces, polymeric surfaces, composites surfaces, etc., i.e., known surface materials for the surface of a molding tool. The first outer layer of the release film eliminates (or reduces) the need for liquid or powder release agents on the tool surface, thereby improving the cleanliness of the manufacturing process and increasing manufacturing throughput, as well as reducing the risk of physical, environmental and personnel hazards and reducing the risk of contaminating surrounding areas (used for subsequent processing) during the application of such liquid or powdered release agents.

Indeed, the material of the first outer layer of the release film is not particularly limited, and may be any material capable of exhibiting sufficient adhesion, as described above. In some embodiments, for example, the first outer layer may include any suitable polymeric material, e.g., a polyolefinic material. In some embodiments, e.g., the polymeric material may include a polyolefinic material that is substantially free of silicon. As used herein, the term "substantially" is used as a term of approximation and not as a term of degree, and is intended to account for the inherent or standard deviations in measured or calculated values and for the inclusion of certain impurities in chemical compositions. For example, as used herein, the term "polymers substantially free of silicon" and like terms refer to polymers that do not intentionally include silicon in the polymer backbone, but that may include silicon as a minor impurity (i.e., in negligible amounts that do not affect the properties or function of the polymers). In some embodiments, however, the polymeric material of the first outer layer may be free or completely free of silicon. In these embodiments, the polymer that is free or completely free of silicon does not include any silicon in the polymer.

In some embodiments, the polymeric material of the first outer layer may include a thermoplastic polymer, thermoplastic elastomer, and/or thermoset polymer. For example, in some embodiments, the first outer layer may include a natural or synthetic thermoplastic, a natural or synthetic thermoplastic elastomer, and/or a thermoset polymer. Some nonlimiting examples of suitable such materials include polyolefins, such as, for example, poly(methyl)pentene (PMP), polypropylene (PP), fluorinated ethylene propylene (FEP), ethylene tetrafluoroethylene (ETFE), perfluoroalkoxy (PFA), polyvinylidene fluoride (PVDF), polyvinyl fluoride (PFA), ethylene chlorotrifluoroethylene (ECTFE), polytetrafluoroethylene (PTFE), polychlorotrifluoroethylene (PCTFE), terpolymers of hexafluoropropylene (HFP), tetrafluoroethylene (TFE) and ethylene, terpolymers of TFE, HFP and vinylidene difluoride (VDF), and fluorocarbon elastomers. For example in some embodiments, the first outer layer (or tool-side outer layer) includes polymethylpentene and/or ETFE.

The first outer layer may also include additional additives, e.g., an adhesion adjusting additive, or a colorant. For example, in some embodiments, the first outer layer may include a colorant. The addition of a colorant to the first outer layer creates a color discrepancy between a first side of the release film (corresponding to the first outer layer) and a second side of the release film (corresponding to the second outer layer). This color discrepancy enables easy detection of the side of the film configured for contact with the molding tool, thereby ensuring that the proper side of the release film is in contact with the molding tool, and the proper side of the release film is in contact with the part being cured. Any suitable colorant may be used for this purpose. In some embodiments, for example, a white or gray colorant may be used, such as those available from Techmer PM, LLC. For example, when a white or gray colorant is used in the first outer layer, the resulting release film may have a white color on the first outer layer side of the release film, with a different shade of the same color on the second outer layer side of the release film. Also, in addition to, or instead of the colorant, the second (or part-side) outer layer and/or first (or tool-side) outer layer of the film may be printed with an ink or other surface identification to differentiate the two surfaces of the film for easy identification of which side of the film should contact the tool or part.

The colorant may be included in the first outer layer in any amount suitable to impart the desired coloring effect so long as the first outer layer maintains the appropriate adhesion and "easy" or "full" release properties. While the amount of the colorant needed to accomplish these goals may vary depending on the selection of the base polymer in the first outer layer and on the material of the intended molding tool, in some embodiments, the colorant may be present in the first outer layer in an amount of about 2 to about 30 wt %, for example about 4 to about 20 wt %, or about 4 to about 15 wt %. In some embodiments, for example, the first outer layer may include about 70 to about 98 wt % of the base polymer, and about 2 to about 30 wt % of the colorant. According to some embodiments, for example, the first coating layer may include about 80 to about 96 wt % of the base polymer, and about 4 to about 20 wt % of the colorant. In some embodiments, for example, the first coating layer may include about 85 to about 96 wt % of the base polymer, and about 4 to about 15 wt % of the colorant. For example, in some embodiments in which the base polymer includes polymethyl pentene, the polymethyl pentene may be present in an amount of about 70 to about 90 wt % (for example, about 75 to about 85 wt %, or about 85 wt %), and the colorant may be present in an amount of about 10 to about 30 wt % (for example, about 15 to about 25 wt %, or about 15 wt %). According to some embodiments, for example, in which the base polymer is ETFE, the ETFE may be present in the first outer layer in an amount of about 85 to about 98 wt % (for example about 94 to about 97 wt %, or about 96 wt %), and the colorant may be present in an amount of about 2 to about 10 wt % (for example, about 3 to about 7 wt %, or about 4 wt %).

While the colorant is described here as optionally included in the first outer layer, it is understood that the colorant may be included in any one or more of the layers of the film. For example, in some embodiments, the colorant is included in the first outer layer. However, in some embodiments, a colorant may not be added to the film, or the colorant may be added to any one or more of the first and/or second outer layers, and/or in any one or more of the optional intervening layers (described in more detail herein) in amounts comparable to those listed here for the first outer layer.

The thickness of the first outer layer is also not particularly limited, and the thickness of the release film as a whole is also not particularly limited. However, in some embodiments, the release film as a whole may have a total thickness of about 0.00003 to about 0.01 inches. In some embodiments, the release film as a whole has a thickness of about 0.0001 to about 0.008 inches, for example about 0.0002 to about 0.006 inches, or about 0.002 to about 0.0015 inches. Accordingly, in some embodiments, the thickness of the first outer layer is adjusted so that the release film as a whole has a thickness within one of these ranges.

As also discussed above, the material of the second outer layer is selected such that the second outer layer exhibits "controlled" or "tight" release (e.g., a stronger adhesion, as that term is defined above) from the surface of the cured part. For example, in some embodiments, the material of the second outer layer may be selected such that it will adhere to the surface of the cured part until pulled or peeled from the surface using an appropriate amount of peeling force. According to some embodiments, for example, the release film resulting from the combination of the first and second outer layers will "easily" or "fully" release from surfaces such as metallic surfaces, wooden surfaces, ceramic surfaces, plaster surfaces, monolithic graphite surfaces, polymeric surfaces, composites surfaces, etc., i.e., known surface materials for the surface of a molding tool. However, the stronger adhesion (and therefore increased tension) of the second layer of the release film to the part surface enables the release film to remain adhered to (or in contact with) the cured (or molded part) during handling and/or subsequent operations that carry the risk of damaging the surface of the cured or molded part. This allows the release film to act as a protective layer over the surface of the cured or molded part, which can be removed at a later time, e.g., after all subsequent processing is complete and the part is ready for painting. Indeed, the second outer layer of the release film exhibits "controlled" or "tight" release from the cured component (e.g., reinforcing fibers in a resinous matrix) such that the release film remains adhered to (or in contact with) the cured part during movement of the part through various stages of manufacture, including, e.g., drilling, grinding, cutting, sawing, sanding, inspection, and testing. After the cured (or molded) part has undergone these processes, the release film can then be removed by the application of a suitable peeling force, and the part can be painted.

The material of the second outer layer of the release film is also not particularly limited, and may be any material capable of exhibiting sufficient adhesion, as described above. In some embodiments, for example, the first outer layer may include any suitable polymeric material, e.g., a polyolefinic material. In some embodiments, e.g., the polymeric material may include a polyolefinic material that is substantially free of silicon. As discussed above in connection with the first outer layer, as used herein, the term "substantially" is used as a term of approximation and not as a term of degree, and is intended to account for the inherent or standard deviations in measured or calculated values and for the inclusion of certain impurities in chemical compositions. For example, as used herein, the term "polymers substantially free of silicon" and like terms refer to polymers that do not intentionally include silicon in the polymer backbone or pendant groups, but that may include silicon as a minor impurity (i.e., in negligible amounts that do not affect the properties or functions of the polymers). In some embodiments, however, the polymeric material of the first outer layer may be free or completely free of silicon. In these embodiments, the polymer that is free or completely free of silicon does not include any silicon in the polymer composition.

In some embodiments, for example, the second outer layer may include a natural or synthetic thermoplastic, a natural or synthetic thermoplastic elastomer, and/or a thermoset polymer. Some nonlimiting examples of suitable such materials include polyolefins, such as, for example, poly (methyl)pentene (PMT), polypropylene (PP), fluorinated ethylene propylene (FEP), ethylene tetrafluoroethylene (ETFE), perfluoroalkoxy (PFA), polyvinylidene fluoride (PVDF), polyvinyl fluoride (PFA), ethylene chlorotrifluoroethylene (ECTFE), polytetrafluoroethylene (PTFE), polychlorotrifluoroethylene (PCTFE), terpolymers of hexafluoropropylene (HFP), tetrafluoroethylene (TFE) and ethylene, terpolymers of TFE, HFP and vinylidene difluoride (VDF), and fluorocarbon elastomers. For example, in some embodiments, the second outer layer (or part-side outer layer) includes ETFE and/or polymethyl pentene.

In addition to the base polymer, the second outer coating layer may further include an additive, e.g., an adhesion adjusting additive, i.e., an additive for tailoring or adjusting adhesion. While the second outer layer may also include a colorant as an additive, the addition of a colorant to the second outer layer may affect the "controlled" or "tight" release characteristic of the layer. Accordingly, in some embodiments, the second outer layer is substantially free of colorants. As used here, the term "substantially" is used as a term of approximation, and not as term of degree, and is intended to account for the inherent and standard deviations in measured or calculated values as well as the inclusion of certain impurities in chemical compositions. For example, the term "substantially free of colorants," as used herein, denotes a composition that does not include any intentionally added colorants, but that may include a colorant compound as an incidental or unintentional impurity (i.e., only a negligible amount of the colorant compound that does not affect the chemical or physical properties of the second layer).

In some embodiments, the second outer layer (or part-side outer layer) may include an adhesion adjusting additive, such as, e.g., PVDF (such as the PVDF available under the trade name KYNAR ADX from Arkema Inc.) and/or a propylene-based elastomer (such as the propylene-based elastomer available under the trade name VISTAMAXX from ExxonMobil Corporation). These adhesion adjusting additives enable the second outer layer to be tailored to the desired adhesion. Indeed, the amount of the base polymer and the amount of the adhesion adjusting additive may be adjusted as necessary to achieve the desired level of adhesion, which will vary (as discussed above) based on the material of the part being cured (or molded). In some embodiments, for example, the second outer layer may include ETFE as the base polymer and PVDF (such as the PVDF available under the trade name KYNAR ADX from Arkema Inc.) as the adhesion adjusting additive. According to some embodiments, the second outer layer may include polymethyl pentene as the base polymer and a propylene-based elastomer (such as the propylene-based elastomer available under the trade name VISTAMAXX from ExxonMobil Corporation) as the adhesion adjusting additive.

The addition of certain adhesion adjusting agents also provides additional benefits to the release film. For example, propylene-based elastomer additives (such as VISTAMAXX from ExxonMobil Corporation) can provide added resistance to tearing or ripping. Accordingly, the addition of propylene-based elastomer additives serve to both adjust the adhesion as well as improve resistance of the film to physical tearing or ripping.

As discussed above, in the second coating layer, the amount of the polymer and the adhesion adjusting additive can be adjusted or tailored to achieve the desired adhesion. As such, the amounts of the polymer and the adhesion adjusting additive are not particularly limited. However, in some embodiments, the second outer layer may include about 60 to about 98 wt % of the base polymer, and about 2 to about 40 wt % of the adhesion adjusting additive. For example, in some embodiments, the second outer layer may include about 70 to about 95 wt % of the base polymer, and about 5 to about 30 wt % of the adhesion adjusting additive. In some embodiments, for example, the second outer layer may include about 60 to about 90 wt % of the base polymer, and about 10 to about 40 wt % of the adhesion adjusting additive. According to some embodiments, for example, the second coating layer may include about 90 to about 98 wt % of the base polymer, and about 2 to about 10 wt % of the adhesion adjusting polymer. For example, in some embodiments in which the base polymer includes polymethyl pentene and the adhesion adjusting additive includes a propylene-based elastomer, the polymethyl pentene may be present in an amount of about 60 to about 90 wt % (for example, about 70 to about 80 wt %, or about 70 wt %), and the propylene-based elastomer may be present in an amount of about 10 to about 40 wt % (for example, about 20 to 35 wt %, or about 30 wt %). According to some embodiments, for example, in which the base polymer is ETFE and the adhesion adjusting additive is PVDF, the ETFE may be present in the second outer layer in an amount of about 90 to about 98 wt % (for example about 94 to about 97 wt %, or about 95 wt %), and the PVDF may be present in an amount of about 2 to about 10 wt % (for example, about 3 to about 7 wt %, or about 5 wt %).

The thickness of the second outer layer is also not particularly limited, and the thickness of the release film as a whole is also not particularly limited. However, in some embodiments, the release film as a whole may have a total thickness of about 0.00003 to about 0.01 inches. In some embodiments, the release film as a whole has a thickness of about 0.0001 to about 0.008 inches, for example about 0.0002 to about 0.006 inches, or about 0.002 to about 0.0015 inches. Accordingly, in some embodiments, the thickness of the second outer layer is adjusted so that the release film as a whole has a thickness within one of these ranges.

In addition to the first and second outer layers, the release film according to embodiments of the present invention may further include additional layers between the first and second outer layers. These additional layers may be added to achieve a particular chemical or physical property. For example, the additional layers may provide a filler to add to substance to the release film, improve handleability, or to improve physical properties, such as, for example, tensile strength, elasticity, suppleness, elongation, drape, etc. The number of additional layers between the first and second outer layers is not particularly limited, and may be any number of layers needed to provide the desired properties. In some embodiments, however, the release film includes from 1 to 13 additional layers.

The composition of the additional layers is also not particularly limited, and may include any compositions needed to achieve the desired physical or chemical properties. For example, in some embodiments, the release film may include an elongation enhancing inner layer. The elongation enhancing inner layer is a "stretchy" layer that provides improved tensile elongation to the resulting release film. The elongation enhancing layer may include any material suitable for providing the desired effect, e.g., the desired increase in elongation. For example, in some embodiments, the elongation enhancing layer may include nylon and/or a thermoplastic elastomer. In some embodiments, for example, the elongation enhancing layer includes nylon, i.e., a polyamide copolymer, a nonlimiting example of which is the polyamide copolymer marketed as VYDYNE 75HF by Ascend Performance Materials Operations LLC. In some embodiments, the elongation enhancing layer includes a thermoplastic elastomer (such as a modified polyolefin thermoplastic elastomer, a nonlimiting example of which is marketed as ADMER SF755A by Mitsui Chemicals America, Inc.) and/or a vinyl acetate-based copolymer, e.g., an ethylene vinyl acetate copolymer (a nonlimiting example of which is marketed as EF439JQ by Westlake Longview Corporation).

In some embodiments, the elongation enhancing layer may further include a colorant. The colorant may be any suitable colorant, such as those described above in connection with the first outer layer. The colorant may be present in the elongation enhancing layer in any suitable amount so long as the elongation enhancing layer remains capable of accomplishing its intended goal, and remains capable of adhering to the first and second outer layers. For example, in some embodiments, the colorant may be present in the elongation enhancing inner layer in an amount of about 1 to about 20 wt %, for example about 2 to about 15 wt %, or about 2.5 to about 14.6 wt %. For example, in some embodiments, the elongation enhancing inner layer may include about 1 to about 20 wt % of the colorant and about 80 to about 99 wt % of the nylon (or polyamide copolymer), thermoplastic elastomer or polyvinyl acetate copolymer. In some embodiments, the elongation enhancing inner layer may include about 2 to about 15 wt % of the colorant and about 85 to about 98 wt % of the nylon (or polyamide copolymer), thermoplastic elastomer or polyvinyl acetate copolymer. For example, in some embodiments, the elongation enhancing layer may include about 2.5 to about 14.6 wt % of the colorant and about 85.4 to about 97.5 wt % of the nylon (or polyamide copolymer), thermoplastic elastomer or polyvinyl acetate copolymer.

In some embodiments, for example, those that include nylon (or a polyamide copolymer), the colorant may be present in an amount of about 10 to about 20 wt %, for example about 13 to about 15 wt %, or about 14.6 wt %. For example, in some embodiments, the elongation enhancing layer may include about 10 to about 20 wt % of the colorant, and about 80 to about 90 wt % of the nylon (or polyamide copolymer). In some embodiments, for example, the elongation enhancing layer may include about 13 to about 15 wt % of the colorant and about 85 to about 87 wt % of the nylon (or polyamide copolymer). In some embodiments, the elongation enhancing layer may include about 14.6 wt % of the colorant and about 85.4 wt % of the nylon (or polyamide copolymer).

In some embodiments, for example, those including a thermoplastic elastomer and/or a polyvinyl acetate copolymer (e.g., a layer including both a thermoplastic elastomer and an ethylene vinyl acetate copolymer), the colorant may be present in an amount of about 1 to about 5 wt %, for example about 1 to about 3 wt %, or about 2.5 wt %. For example, the elongation enhancing layer may include about 1 to about 5 wt % of the colorant and about 95 to about 99 wt % of the thermoplastic elastomer and/or the polyvinyl acetate copolymer. In some embodiments, for example, the elongation enhancing layer may include about 1 to about 3 wt % of the colorant and about 97 to about 99 wt % of the thermoplastic elastomer and/or the polyvinyl acetate copolymer. In some embodiments, the elongation enhancing layer may include about 2.5 wt % of the colorant and about 97.5 wt % of the thermoplastic elastomer and/or the polyvinyl acetate copolymer.

Additionally, in embodiments in which the elongation enhancing layer includes both a thermoplastic elastomer and a polyvinyl acetate copolymer (such as, for example, an ethylene vinyl acetate copolymer), the elongation enhancing layer may include any suitable amount of elastomer and the copolymer. For example, in some embodiments, the thermoplastic elastomer may include about 30 to about 50 wt % of the thermoplastic elastomer, for example about 35 to about 45 wt %, or about 40 wt %. In some embodiments, the polyvinyl acetate copolymer may be present in the elongation layer in an amount of about 40 to about 70 wt %, for example about 50 to about 60 wt %, or about 57.5 wt %. For example, in some embodiments, the elongation enhancing layer may include about 30 to about 50 wt % of the thermoplastic elastomer, and about 40 to about 70 wt % of the polyvinyl acetate copolymer, with the balance being the colorant (if present). In some embodiments, for example, the elongation enhancing layer may include about 35 to about 45 wt % of the thermoplastic elastomer, and about 50 to about 60 wt % of the polyvinyl acetate copolymer, with the balance being the colorant (if used). For example, in some embodiments, the elongation enhancing layer may include about 40 wt % of the thermoplastic elastomer, about 57.5 wt % of the polyvinyl acetate copolymer, and about 2.5 wt % of the colorant.

The thickness of the elongation enhancing inner layer is not particularly limited, and the thickness of the release film as a whole is also not particularly limited. However, in some embodiments, the release film as a whole may have a total thickness of about 0.00003 to about 0.01 inches. In some embodiments, the release film as a whole has a thickness of about 0.0001 to about 0.008 inches, for example about 0.0002 to about 0.006 inches, or about 0.002 to about 0.0015 inches. Accordingly, in some embodiments, the thickness of the elongation enhancing layer is adjusted so that the release film as a whole has a thickness within one of these ranges.

The release film may also include one or more tie layers as one of the additional inner layers between the first and second outer layers. The tie layer(s) may improve adhesion of the different layers of the release film to each other, preventing (or reducing) the risk of layer separation. The tie layer(s) may be positioned between the first and second outer layers, between the first outer layer and another additional inner layer (for example, the elongation enhancing layer discussed herein), and/or between the second outer layer and an additional inner layer (for example, the elongation enhancing layer discussed herein). In some embodiments, for example, the release film includes the first and second outer layers discussed herein, the elongation enhancing layer discussed herein, and first and second tie layers. The first tie layer is between the first outer layer and the elongation layer (as used herein, the terms "elongation enhancing layer" and "elongation layer" and like terms are interchangeable and refer to the elongation enhancing inner layer). The second tie layer is between the second outer layer and the elongation layer. This configuration yields a release film having five layers, namely, the first outer layer, the first tie layer, the elongation layer, the second tie layer, and the second outer layer. However, it is understood that the present disclosure is not limited to release films having five layers, and instead, as discussed herein, the release film may have any number of layers so long as the release film includes at least the first and second outer layers.

As would be recognized by those of ordinary skill in the art, the composition of the first and second tie layers will depend on the materials of the layers to which the tie layers are adhered. In particular, as would be appreciated by those of ordinary skill in the art, not all adhesive materials adhere to all layer surfaces. Accordingly, the material of tie layer should be selected so that the tie layer can effectively adhere the two layers which it contacts to each other.

The materials of the first and second tie layers are not particularly limited, and the first and second tie layers may include the same material or different materials depending on their intended use. In some embodiments, however, the material of each tie layer may include a maleic anhydride modified polypropylene (a nonlimiting example of which is ADMER QB520A available from Mitsui Chemicals America, Inc.). In some embodiments, however, the maleic anhydride is diluted with polypropylene, for example, polypropylene homopolymer (such as, e.g., the polypropylene copolymer marketed as PP 4170 by Total Petrochemicals USA, Inc. (Houston, Tex.). This added polypropylene is included in any suitable amount to provide the desired balance of bondability between layers, and releasability of the first and second outer layers of the release film. The added polypropylene also serves to prevent (or reduce) the "bleedthrough" that sometimes occurs when commercial maleic anhydride is used in undiluted form. In particular, in making the release films according to embodiments of the present invention, it was found that when used as the tie layer, commercial, "off-the-shelf" maleic anhydride compositions leaked maleic anhydride, which in turn, detrimentally affected the bondability of the tie layer. To address this problem, the tie layer compositions according to embodiments of the present invention include the commercial maleic anhydride composition diluted with added polypropylene. In some embodiments, for example, the maleic anhydride composition (e.g., a commercially available maleic anhydride product) is diluted with added polypropylene so that the tie layer composition may include about 50 to about 80 wt % of the maleic anhydride composition, and about 20 to about 50 wt % of the added polypropylene. For example, in some embodiments, the tie layer may include about 60 to about 70 wt % of the maleic anhydride composition, and about 30 to about 40 wt % of the added polypropylene. In some embodiments, for example, the tie layer may include about 60 wt % of the maleic anhydride composition and about 40 wt % of the added polypropylene.

As used herein, the term "added polypropylene" and like terms refers to the polypropylene that is added to the maleic anhydride composition to further dilute the maleic anhydride. In particular, the maleic anhydride compositions available commercially often include a mixture of maleic anhydride with an amount of polypropylene. As such, the term "added polypropylene" refers only to the amount of polypropylene added to the commercial product, and does not refer to the final concentration of polypropylene in the tie layer composition. Indeed, the manufacturers of the commercial maleic anhydride compositions do not report the amount of maleic anhydride and the amount of polypropylene in their products. Accordingly, as used herein, the term "maleic anhydride composition" refers to commercial maleic anhydride products, which include varying amounts of maleic anhydride and polypropylene. In embodiments of the tie layers including maleic anhydride, the amount of added polypropylene may be adjusted within the ranges disclosed herein based on the amount of maleic anhydride and polypropylene present in the maleic anhydride commercial product.

In some embodiments, the tie layer may include a polyvinyl acetate or an ETFE based adhesive. For example, in some embodiments, the tie layer may include an ETFE based adhesive (nonlimiting examples of which are those marketed under the FLUON trademark (e.g., KS088 and JP726) by AGC Chemicals Americas, Inc.), polyethylene co-methyl acrylate and/or ethylene vinyl acetate. Polyvinyl acetate and ETFE based tie layers do not suffer from the same drawbacks as commercial maleic anhydride compositions. Indeed, the polyvinyl acetate and ETFE type tie layers do not suffer from the "bleedthrough" problem discussed above in connection with commercial maleic anhydride compositions. Accordingly, it is not necessary to dilute these types of tie layer compositions with added polypropylene. Indeed, in some embodiments, the tie layer composition includes 100 wt % of the polyvinyl acetate product, e.g., the polyethylene co-methyl acrylate and or ethylene vinyl acetate, or 100 wt % of the ETFE based adhesive. However, many commercially available polyvinylacetate products are themselves mixtures or copolymers of polyvinylacetate with another polymer or solvent. These polyvinylacetate products can have polyvinylacetate concentrations ranging from about 5 wt % to about 40 wt %, for example, about 5 wt % to about 36 wt %. In some embodiments, therefore, the polyvinylacetate tie layer material may include about 5 wt % to about 40 wt %, for example, about 5 wt % to about 36 wt % polyvinylacetate.

The polymer or solvent in the polyvinylacetate tie layer material may be any suitable polymer or solvent. Nonlimiting examples of suitable polymers or solvents include polyolefins, such as, for example, polypropylene and/or polyethylene. The polymer or solvent may be present in the polyvinyl acetate tie layer material in a concentration of about 60 wt % to about 95 wt %, or about 64 wt % to about 95 wt %.

The thickness of each of the first and second tie layers is not particularly limited, and the thickness of the release film as a whole is also not particularly limited. However, as discussed above, in some embodiments, the release film as a whole may have a total thickness of about 0.00003 to about 0.01 inches. In some embodiments, the release film as a whole has a thickness of about 0.0001 to about 0.008 inches, for example about 0.0002 to about 0.006 inches, or about 0.002 to about 0.0015 inches. Accordingly, in some embodiments, the thickness of each of the first and second tie layers may be independently adjusted so that the release film as a whole has a thickness within one of these ranges.

The release film may be manufactured by any suitable process, including, for example, co-extrusion and lamination. However, in some embodiments, the release film is manufactured by simultaneously co-extruding all the layers of the release film. As would be understood by those of ordinary skill in the art, the simultaneous co-extrusion process involves the use of multiple extruders that extrude their respective compositions in a molten state simultaneously onto the same annular die. This simultaneous co-extrusion enables the simultaneous deposition of the liquid compositions of each of the layers, resulting in a monolithic film construction. Additionally, co-extrusion enables the production of large scale, wide format films, which eliminates (or at least significantly reduces) the need to join two films together to cover a large surface area. In some embodiments, however, the release film may be formed by sequential lamination of each of the layers. Both co-extrusion and lamination methods are well known to those of skill in the art.

In use, the release film according to embodiments of the present invention is applied on the molding die using vacuum to keep the film in place during application and curing of the part (e.g., the prepreg). After application of the release film to the molding tool, the part manufacture process may continue as normal. The molded part manufacturing process is well known to those of ordinary skill in the art.

EXAMPLES

The following Examples are provided for illustrative purposes only, and do not limit the scope or content of the present disclosure.

Example 1

A release film was prepared with a first outer layer, a first tie layer, an elongation enhancement layer, a second tie layer and a second outer. The first outer layer included polymethylpentene and accounted for 19 vol % of the release film. The first tie layer included a functionalized homopolymer polypropylene adhesive combined with a polypropylene copolymer. The first tie layer accounted for 10 vol % of the release film. The elongation layer included a copolyamide and accounted for 42 vol % of the release film. The second tie layer included a functionalized homopolymer polypropylene adhesive combined with a polypropylene copolymer. The second tie layer accounted for 10 vol % of the release film. The second outer layer included polymethylpentene combined with a polypropylene-based elastomer manufactured by ExxonMobil Corporation under the tradename VISTAMAXX. Each of the compositions for the five layers were loaded into a respective extruder, and then simultaneously co-extruded onto an annular die to form a monolithic release film.

Example 2

A release film was manufactured as in Example 1 except that the compositions of the first outer layer, first tie layer, elongation layer, second tie layer and second outer layer were as follows. The first layer included ETFE and accounted for 19 vol % of the release film. The first tie layer included an ETFE based adhesive manufactured by AGC Chemicals Americas, Inc. under the tradename FLUON. The first tie layer accounted for 10 vol % of the release film. The elongation layer included a copolyamide modified by the addition of a functionalized thermoplastic elastomeric adhesive. The elongation layer accounted for 42 vol % of the release film. The second tie layer included an ETFE based adhesive manufactured by AGC Chemicals Americas, Inc. under the tradename FLUON. The second tie layer accounted for 10 vol % of the release film. The second outer layer included ETFE combined with PVDF manufactured by Arkema Inc. under the tradename KYNAR ADX.

Example 3

A release film was manufactured as in Example 1 except that the compositions of the first outer layer, first tie layer, elongation layer, second tie layer and second outer layer were as follows. The first layer included ETFE and accounted for 19 vol % of the release film. The first tie layer included an ETFE based adhesive manufactured by AGC Chemicals Americas, Inc. under the tradename FLUON. The first tie layer accounted for 10 vol % of the release film. The elongation layer included a copolyamide modified by the addition of a functionalized thermoplastic elastomeric adhesive. The elongation layer accounted for 42 vol % of the release film. The second tie layer included an ETFE based adhesive manufactured by AGC Chemicals Americas, Inc. under the tradename FLUON. The second tie layer accounted for 10 vol % of the release film. The second outer layer included ETFE combined with KS088 ETFE manufactured by AGC Chemicals Americas, Inc. under the tradename FLUON. In the second outer layer the ETFE/KS088 ratio was 70/30 based on weight.

Example 4

A release film was manufactured as in Example 1 except that the compositions of the first outer layer, first tie layer, elongation layer, second tie layer and second outer layer were as follows. The first layer included 85 wt % polymethylpentene manufactured by Mitsui Chemicals America, Inc. as TPX MX002, and 15 wt % of a gray colorant obtained from Techmer PM, LLC. The first tie layer included 60 wt % of a modified polyolefin thermoplastic elastomer manufactured by Mitsui Chemicals America, Inc. as ADMER QB520A, and 40 wt % of polypropylene manufactured by Total Petrochemicals USA, Inc. (Houston, Tex.) as Polypropylene 4170. The elongation layer included 85.4 wt % of a polyamide copolymer manufactured by Ascend Performance Materials Operations LLC as VYDYNE 75HF, and a gray colorant obtained from Techmer PM, LLC. The second tie layer included 60 wt % of a modified polyolefin thermoplastic elastomer manufactured by Mitsui Chemicals America, Inc. as ADMER QB520A, and 40 wt % of polypropylene manufactured by Total Petrochemicals USA, Inc. (Houston, Tex.) as Polypropylene 4170. The second outer layer included 70 wt % polymethylpentene manufactured by Mitsui Chemicals America, Inc. as TPX MX002, and 30 wt % of a polypropylene-based elastomer manufactured by ExxonMobil Corporation under the tradename VISTAMAXX 6102.

Example 5

A release film was manufactured as in Example 1 except that the compositions of the first outer layer, first tie layer, elongation layer, second tie layer and second outer layer were as follows. The first layer included 96 wt % ETFE manufactured by AGC Chemicals Americas, Inc. as C88A, and 4 wt % of a white colorant obtained from AGC Chemicals Americas, Inc. The first tie layer included 100 wt % of KS088 (an ETFE based adhesive manufactured by AGC Chemicals Americas, Inc. under the tradename FLUON). The elongation layer included 40 wt % of a modified polyolefin thermoplastic elastomer manufactured by Mitsui Chemicals America, Inc. as ADMER SF755A, 57.5 wt % of an ethyl vinyl acetate copolymer manufactured by Westlake Longview Corporation, and 2.5 wt % of a gray colorant obtained from Techmer PM, LLC. The second tie layer included 100 wt % of KS088 (an ETFE based adhesive manufactured by AGC Chemicals Americas, Inc. under the tradename FLUON). The second outer layer included 95 wt % ETFE manufactured by AGC Chemicals Americas, Inc. as C88A, and 5 wt % of a PVDF manufactured by Arkema Inc. under the tradename KYNAR ADX (1285-03).

Each of the films prepared according to Examples 1 through 5 were applied to a molding tool, and then a composite part was laid-up on the film. After the composite part was cured, the part with the film adhered was peeled from the molding tool by a skilled technician. Using a "peel-by-feel" methodology, by knowledgeable observation with the naked eye and skilled touch, the skilled technician noted that each of the films adhered to the cured composite parts were sufficient to remain adhered to the part after subsequent processing (e.g., drilling, etc.) by observing the look and feel of the film. Additionally, the skilled technician peeled the film from the cured composite part and noted that the amount of peel force required to remove the film from the composite indicated that film would have remain adhered to the part during any subsequent processing procedure.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "an" additive, "a" colorant, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as including a first outer layer including a base polymer and a colorant, a first outer layer consisting essentially of or consisting of a base polymer or a base polymer and a colorant is also within the scope of this disclosure. Accordingly, the first outer layer may consist essentially of the base polymer or the base polymer and the colorant. In this context, "consisting essentially of" means that any additional components in the first outer layer will not materially affect the adhesion and releasability of the first outer layer with respect to the surface of the molding tool.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "a" colorant or "an" additive, a mixture of such colorants or additives can be used. When ranges are given, any endpoints of those ranges and/or numbers within those ranges can be combined within the scope of the present disclosure. The terms "including" and like terms mean "including but not limited to," unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A release film, comprising:
   a first outer layer having a first adhesion affinity and comprising a first base polymer comprising a polymethylpentene; and
   a second outer layer having a second adhesion affinity that is different from the first adhesion affinity of the first outer layer, the second outer layer comprising:
      a second base polymer comprising a polymethylpentene, and
      an adhesion adjusting additive comprising polyvinylidene fluoride or a propylene-based elastomer or an ethylene tetrafluorotheylene (ETFE) additive, the adhesion adjusting additive present in the second outer layer in an amount of about 2 to about 40 wt % based on a total weight of the second outer layer.

2. The release film according to claim 1, wherein the first outer layer further comprises a colorant.

3. The release film according to claim 1, further comprising at least one additional layer between the first and second outer layers.

4. The release film according to claim 1, further comprising an elongation layer between the first and second outer layers, the elongation layer comprising nylon and/or a thermoplastic elastomer.

5. The release film according to claim 4, further comprising a first tie layer between the elongation layer and the first outer layer.

6. The release film according to claim 4, further comprising a second tie layer between the elongation layer and the second outer layer.

7. The release film according to claim 5, further comprising a second tie layer between the elongation layer and the second outer layer.

8. The release film according to claim 1, wherein the first and second outer layers are simultaneously coextruded to form a monolithic film.

9. The release film according to claim 7, wherein the first and second outer layers, the elongation layer, and the first and second tie layers are simultaneously coextruded to form a monolithic film.

10. The release film according to claim 1, wherein the first adhesion affinity of the first outer layer is such that the first outer layer exhibits full release from a metallic or composite material surface.

11. The release film according to claim 1, wherein the second adhesion affinity of the second outer layer is such that the second outer layer exhibits tight release from a composite material.

12. The release film according to claim 10, wherein the second adhesion affinity of the second outer layer is such that the second outer layer exhibits tight release from a composite material.

13. The release film according to claim 1, wherein one or more of the first outer layer and the second outer layer further comprises a colorant.

14. The release film according to claim 4, wherein one or more of the first outer layer, the second outer layer and the elongation layer further comprises a colorant.

15. The release film according to claim 5, wherein one or more of the first outer layer, the second outer layer, the elongation layer and the first tie layer further comprises a colorant.

16. The release film according to claim 6, wherein one or more of the first outer layer, the second outer layer, the elongation layer and the second tie layer further comprises a colorant.

17. The release film according to claim 7, wherein one or more of the first outer layer, the second outer layer, the elongation layer, the first tie layer and the second tie layer further comprises a colorant.

18. The release film according to claim 1, wherein the adhesion adjusting additive is present in the second outer layer in an amount of about 10 to about 40 wt % based on a total weight of the second outer layer.

19. The release film according to claim 1, further comprising a tie layer between the first outer layer and the second outer layer.

20. The release film according to claim 19, wherein the first and second outer layers and the tie layer are simultaneously coextruded to form a monolithic film.

* * * * *